(12) United States Patent
Kumhyr et al.

(10) Patent No.: US 7,752,614 B2
(45) Date of Patent: Jul. 6, 2010

(54) DYNAMIC WORKFLOW DOCUMENTATION SYSTEM

(75) Inventors: David B. Kumhyr, Austin, TX (US); Patrick J. Brooks, Toronto (CA); Rhonda L. Childress, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/388,003

(22) Filed: Mar. 23, 2006

(65) Prior Publication Data

US 2007/0226680 A1    Sep. 27, 2007

(51) Int. Cl.
*G06F 17/30* (2006.01)

(52) U.S. Cl. ............... 717/166; 707/103 R; 707/103 Y; 707/103 X; 707/103 Z

(58) Field of Classification Search ............. 707/103 R, 707/103 Y, 103 X, 103 Z; 717/100–105, 717/166
See application file for complete search history.

(56) References Cited

U.S. PATENT DOCUMENTS

| | | | |
|---|---|---|---|
| 5,960,404 A * | 9/1999 | Chaar et al. .................... | 705/8 |
| 6,349,238 B1 | 2/2002 | Gabbita et al. | |
| 6,567,783 B1 | 5/2003 | Notani et al. | |
| 6,697,783 B1 | 2/2004 | Brinkman et al. | |
| 6,725,445 B1 | 4/2004 | Leymann et al. | |
| 6,820,118 B1 | 11/2004 | Leymann et al. | |
| 6,832,201 B1 | 12/2004 | Leymann et al. | |
| 7,100,147 B2 * | 8/2006 | Miller et al. ................. | 717/102 |
| 7,114,152 B2 * | 9/2006 | Hogstrom et al. ........... | 717/166 |
| 7,350,209 B2 * | 3/2008 | Shum ........................ | 718/104 |
| 7,386,529 B2 * | 6/2008 | Kiessig et al. ................. | 707/1 |
| 7,555,538 B2 * | 6/2009 | Shenfield et al. ............ | 709/219 |
| 2002/0077945 A1 * | 6/2002 | Leymann et al. .............. | 705/35 |
| 2003/0004770 A1 * | 1/2003 | Miller et al. .................... | 705/8 |
| 2003/0004771 A1 * | 1/2003 | Yaung ............................ | 705/8 |
| 2003/0005406 A1 * | 1/2003 | Lin et al. ..................... | 717/102 |
| 2003/0023728 A1 * | 1/2003 | Yaung ........................ | 709/226 |
| 2003/0023773 A1 * | 1/2003 | Lee et al. ..................... | 709/328 |
| 2003/0028550 A1 * | 2/2003 | Lee et al. ..................... | 707/200 |
| 2003/0061266 A1 * | 3/2003 | Ouchi ......................... | 709/106 |
| 2004/0078105 A1 * | 4/2004 | Moon et al. ................. | 700/100 |
| 2004/0143597 A1 * | 7/2004 | Benson et al. ........... | 707/104.1 |
| 2006/0112062 A1 * | 5/2006 | Leymann et al. ............... | 707/1 |

OTHER PUBLICATIONS

Akram et al., "Application of Business Process Execution Language to Scientific Workflow", Sep. 2006, 14 pages.*

* cited by examiner

*Primary Examiner*—Don Wong
*Assistant Examiner*—Hanh B Thai
(74) *Attorney, Agent, or Firm*—Yee & Associates, P.C.; William H. Steinberg; Rudolf O. Siegesmund

(57) ABSTRACT

The dynamic workflow documentation system creates an instance of a workflow program, extracts metadata properties from the workflow programs, records the metadata properties, notifies the workflow manager that a new instance of the workflow program has been created. Security and auditing functions of the dynamic workflow documentation system ensure that workflow programs execute according to the workflow requirements.

1 Claim, 3 Drawing Sheets

DYNAMIC WORKFLOW DOCUMENTATION SYSTEM

CROSS-REFERENCE TO RELATED APPLICATION

The present invention is related to the subject matter of U.S. patent application Ser. No. 11/225,678 incorporated herein by reference.

FIELD OF THE INVENTION

The present invention comprises subject matter directed to organizing and relating workflow components in an operational workflow process to facilitate the reporting and display of workflow status information.

BACKGROUND OF THE INVENTION

A "workflow" is a familiar concept to many people. Generally, a "workflow" is any series of steps or activities necessary for completing a particular task. A "workflow component" is any convenient set of related activities that the workflow treats as a single unit of activity. For example, the activities required to process an airline passenger before boarding an airplane could be described as a workflow. In such a scenario, the carrier generally verifies a passenger's identity, confirms the passenger's reservation, allocates a seat on the airplane, and prints a boarding pass. The carrier also may process a credit card transaction to pay for the ticket if the passenger has not yet paid. If the passenger has baggage, the carrier also may print a baggage tag. These activities likely are distributed among a number of employees throughout the organization. From the airline's perspective, then, the workflow is comprised of components executed by various employees. Thus, the workflow components of a "check-in" workflow could be described as: (1) get identification; (2) read passenger's credit card; (3) identify passenger's reservation; (4) get passenger's baggage; (5) allocate passenger's seat; (6) print passenger's boarding pass; (7) print passenger's baggage tag; and so forth. Some, all, or none, of these workflow components may be automated.

A "workflow application" is any computer program designed to coordinate or manage a workflow, particularly in an enterprise setting. Thus, in the above example, a workflow application could coordinate the workflow components among the various employees that are involved in the transaction.

Workflow applications are common in the enterprise context. Many workflow applications are highly specialized for a specific industry, such as the medical application disclosed in U.S. Pat. No. 6,697,783 (issued Feb. 24, 2004). Other such systems, though, have been designed to accommodate more generalized needs, including the system disclosed in U.S. Pat. No. 6,567,783 (issued May 20, 2003).

Many workflow applications also track the status of workflows and provide a console or other means for displaying status information to a user. In practice, a single enterprise often uses a variety of workflow applications to coordinate and manage its everyday operations. But conventional workflow applications are stand-alone applications that are incapable of interacting with other workflow applications in a heterogeneous business system. An enterprise that uses a variety of workflow applications may require many consoles to monitor all of its workflows.

Thus, there is a need in the art for a system that organizes and relates workflow components in an operational workflow process to facilitate the reporting and display of workflow status information.

SUMMARY OF THE INVENTION

The dynamic workflow documentation system meets the need identified above. The dynamic workflow documentation system is a computer implemented process comprising the following steps: The dynamic workflow documentation system starts a workflow manager program, a class loader program in a computer memory and creates an instance of a workflow program in the computer memory. The dynamic workflow documentation system extracts metadata properties from the workflow program and records the metadata properties in the memory. The dynamic workflow documentation system notifies the workflow manager that a new instance of the workflow program has been created and repeats the steps of creating an instance of a workflow component program, extracting metadata properties, recording the metadata properties and notifying the workflow manager for all workflow components associated with the workflow program.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single program that configures and enables one or more general-purpose computers to implement the novel aspects of the invention. For illustrative purposes, the inventive computer program will be referred to as the "workflow program."

Figure 1:
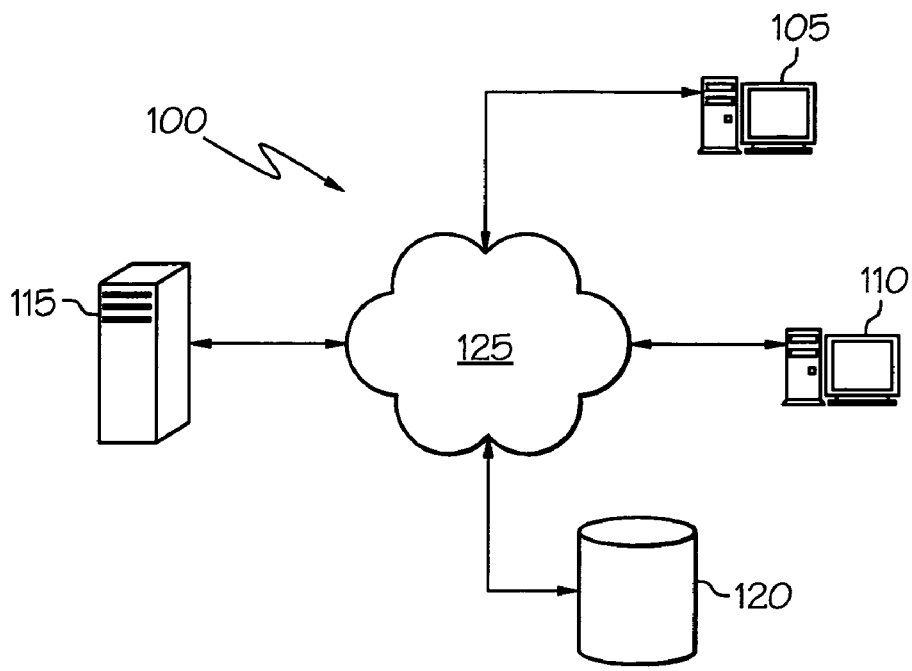
FIG. 1 illustrates an exemplary network of hardware devices in which the present invention can be practiced.

Additionally, the workflow program is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
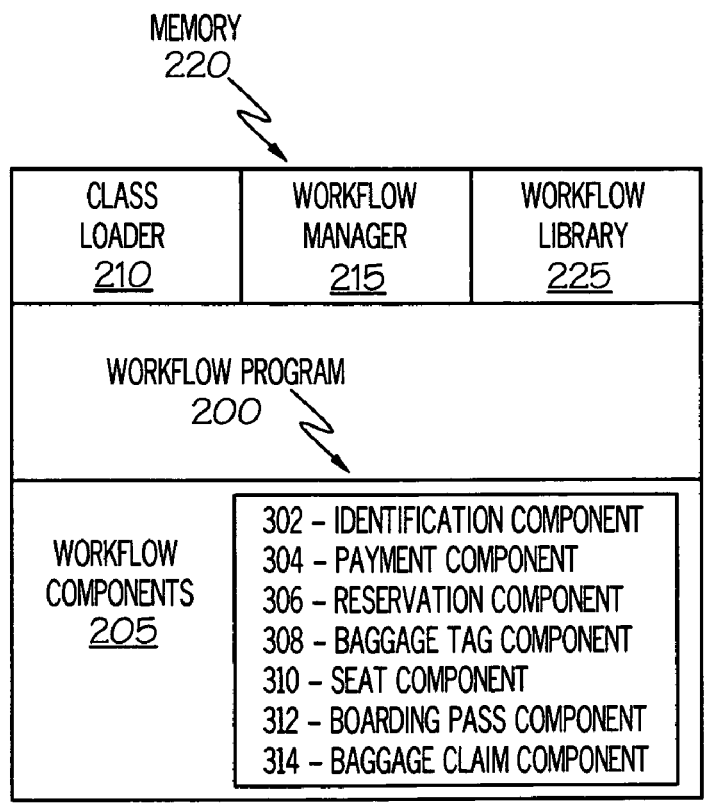
FIG. 2 is a schematic of a memory having components of the present invention stored therein.

Workflow program 200 and its components, including workflow components 205 and class loader 210 typically are stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media and network nodes. Workflow program 200 and its components may reside in any single network node, such as network nodes 105-120, or may be distributed across several network nodes. Thus, FIG. 2 is included merely as a descriptive expedient and does not necessarily reflect any particular physical embodiment of memory 220. As depicted in FIG. 2, though, memory 220 may include additional data and programs. Of particular import to workflow program 200, memory 220 may include workflow manager 215, with which workflow program 200 interacts.

Workflow program 200 is described herein as an object-oriented program, and more particularly as an object-oriented JAVA application. JAVA provides many tools and resources that facilitate the development of distributed, modular applications, including an introspection mechanism and a vast library of classes distributed by the vendor. The significance of these tools will become apparent in the description that follows. Notwithstanding the advantages of JAVA, though, those skilled in the art will recognize that the principles and functions described below may be implemented in a variety of programming languages using a variety of programming models.

Workflow program 200 comprises an assembly of workflow components 205, each of which represents any programming unit designed to coordinate or manage a convenient set of related activities that can be treated as a single unit of activity. In the embodiment described here, each workflow component 205 is implemented as an object, which is defined by a specific class, and is stored in a workflow library. Once assembled, workflow program 200 also may be stored in the workflow library, along with other workflow programs. Like workflow components 205, workflow programs stored in the library can then be combined to produce new workflow programs. The workflow library is depicted as workflow library 225 in FIG. 2.

Each workflow component class includes properties and methods that support the operational functions of the workflow component, but also include metadata properties that provide information about the workflow component itself. These classes also may include metadata methods that provide indirect access to these metadata properties. Examples of metadata properties include, without limitation, unique identifiers, descriptors, approval flags, and checksum values. The significance of these types of metadata properties are discussed below in more detail.

As described herein, workflow program 200 includes class loader 210, but those skilled in the art will appreciate that class loaders commonly are invoked from other software elements. Particularly in the JAVA environment, class loaders typically are invoked by the JAVA virtual machine. Basic class loaders merely create instances of particular classes (i.e. "objects") at run-time, but class loaders can be customized to provide additional functions. Here, class loader 210 is a custom class loader that creates an instance of workflow component 205 as needed at run-time, and also introspects workflow component 205 to extract its metadata properties. Class loader 210 then can store the metadata properties in a memory, such as memory 220. Class loader 210 also can track the number and type of each workflow component that it creates, and store that information in memory.

Finally, workflow program 200 interacts with workflow manager 215. Workflow manager 215 analyzes the metadata properties and other data collected by class loader 210, and provides requested status information to other programs or to an end-user.

Figure 3A:
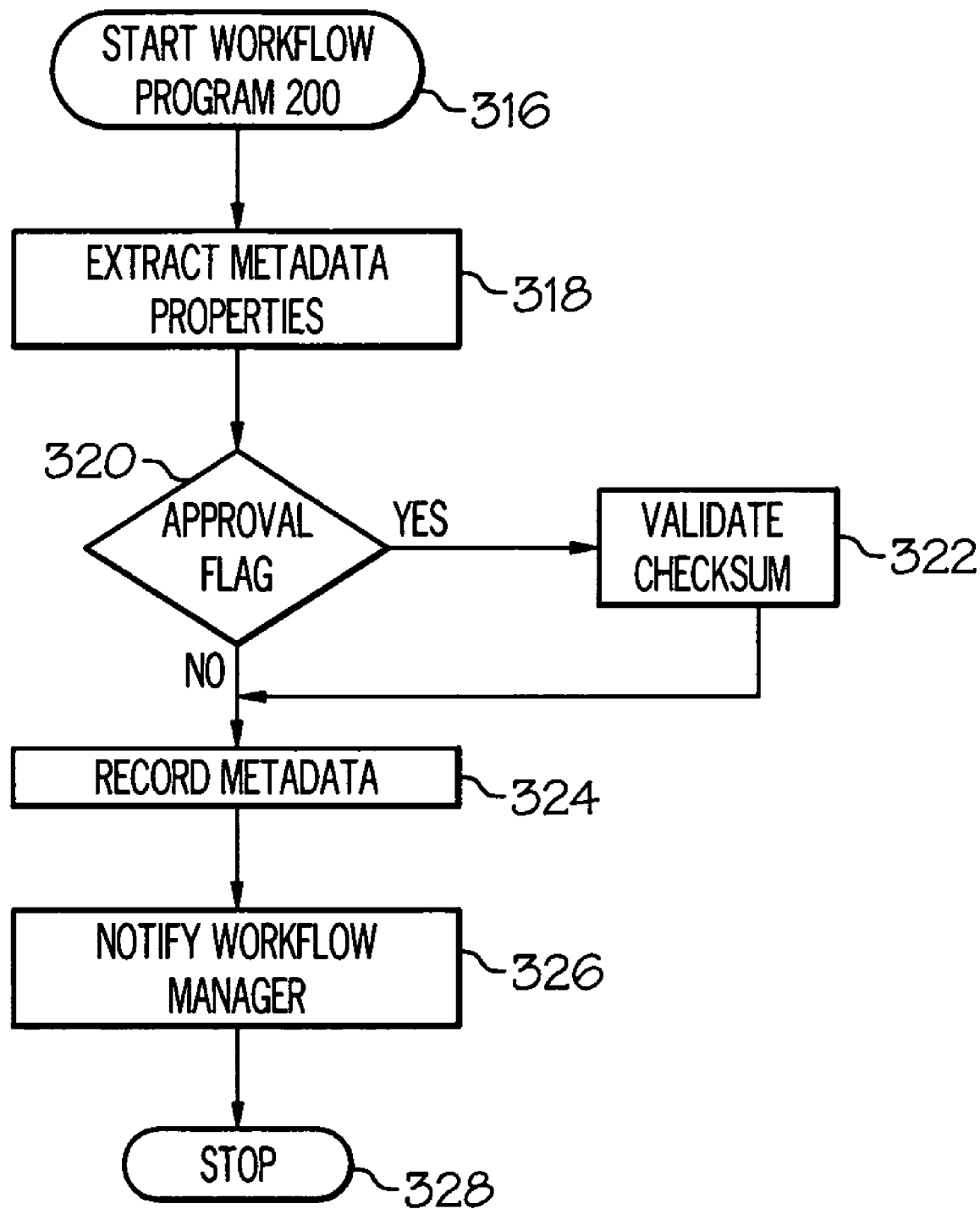
FIG. 3 is a flowchart of an embodiment of the present invention.
Figure 3B:
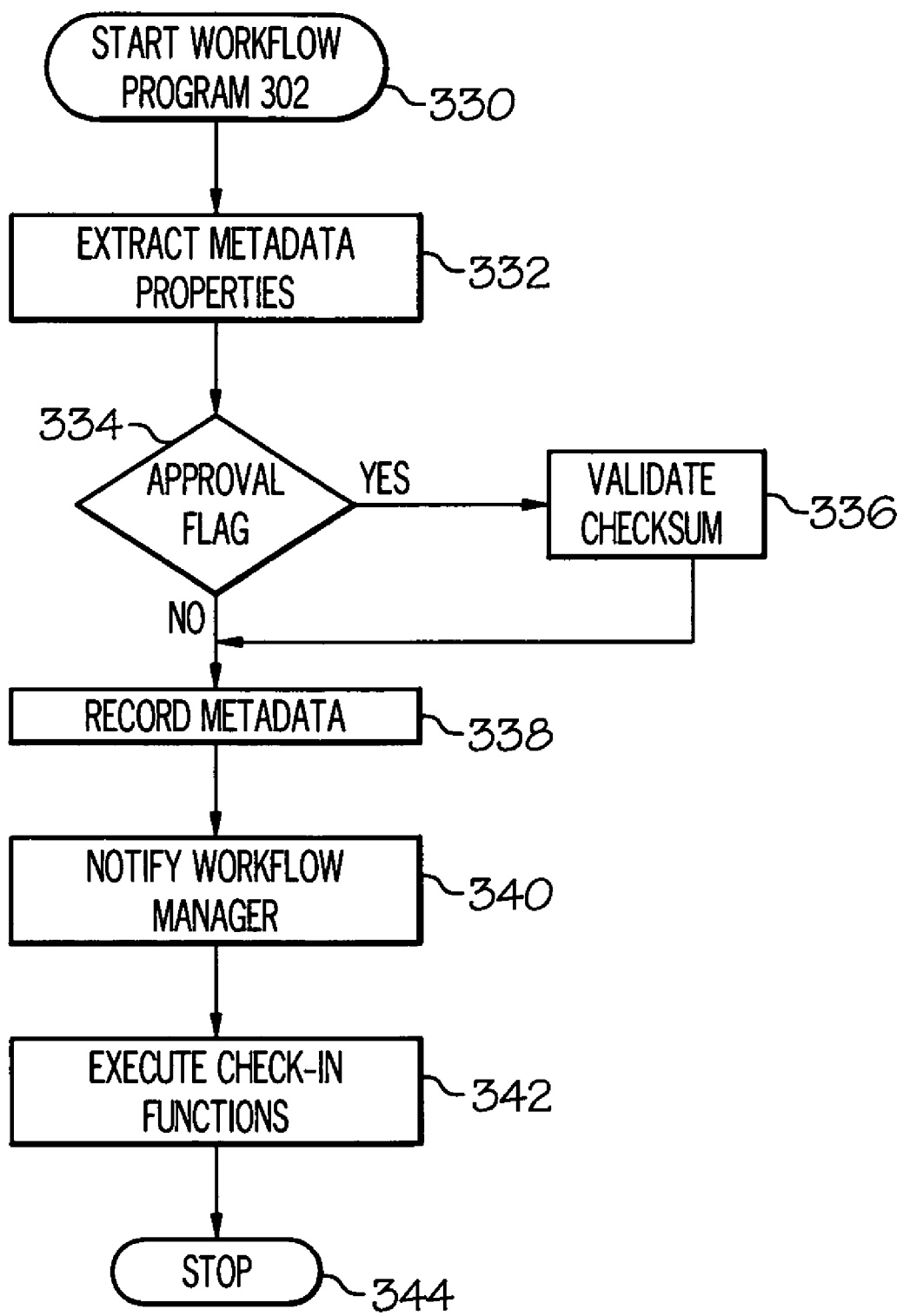

The operation of workflow program 200 is illustrated in FIG. 3 using a simple airline check-in workflow as an example. Of course, those skilled in the art will appreciate the general applicability of the principles described herein to any workflow. In this example, though, the operational workflow embodied in workflow program 200 comprises workflow components 302-314, which are assembled by a workflow developer at design-time in an order that facilitates the check-in activities. For example, workflow component 302 prompts an operator to collect proper identification and enter identification data, such as the passenger's name. Workflow component 304 prompts an operator to collect and enter a credit card number from the passenger. Workflow component 306 then prompts the operator to collect reservation information from the passenger and queries the reservation database to identify the passenger's reservation. Workflow component 308 prompts an operator to collect the passenger's baggage and enter baggage data, such as the number of bags. Workflow component 310 then allocates a seat to the passenger. Workflow component 312 prints the passenger's boarding pass. Finally, workflow component 314 prints the passenger's baggage claim ticket. Each of workflow components 302-314 include metadata properties that describe the component's class, identify the author of the workflow component, indicate the approval status of the workflow component, and provide a checksum value for the workflow component. In the embodiment described here, workflow program 200 also includes these metadata properties.

An operator invokes workflow program 200 when a passenger arrives at the ticket counter or gate and requests to check-in. Many contemporary hardware and software platforms, including JAVA, support distributed processing architectures. Thus, those skilled in the art will appreciate that an operator may invoke workflow program 200 remotely over a network, such as exemplary network 100, or locally on any workstation within the network. As FIG. 3 illustrates, class loader 210 first creates an instance of workflow program 200 (316) and introspects workflow program 200 to extract its metadata properties (318). Optionally, class loader 210 may check the approval flag (320) to verify that workflow program 200 has been approved for enterprise use, and may validate the checksum value (322) to confirm that workflow program 200 has not been altered or tampered with since receiving approval. Class loader 210 then records the metadata properties (324) in a memory and notifies workflow manager 215 that a new instance of workflow program 200 has been created (326). Alternatively, workflow manager 215 periodically polls the memory to retrieve updated metadata properties then stops (328). Class loader 210 next creates an instance of workflow component 302 (330), and introspects this component to extract its metadata properties (332). Optionally, class loader 210 again verifies the integrity of workflow component 302 by checking its approval flag (334) and checksum value (336). And again, class loader 210 records the metadata properties (338) in memory and notifies workflow manager 215 that a new instance of workflow component 302 has been created (340), or alternatively, workflow manager 215 periodically polls the memory to retrieve updated information. Workflow component 302 then executes its check-in functions (342), which are described above then stops (344). As FIG. 3 illustrates, workflow program 200 then invokes workflow components 304-314 to execute their respective check-in functions in the sequence prescribed by the workflow developer, while class loader 210 creates an instance of each workflow component, introspects each workflow component, and records each workflow component's metadata properties, as just described.

As class loader 210 extracts and records metadata properties, workflow manager 215 analyzes the metadata properties and produces requested workflow status information. The workflow status information can be determined and requested by an end user, or by a console program. Given certain metadata properties, such as those identified above, workflow manager 215 can identify each workflow component and enforce security policies. Much like class loader 210, workflow manager 215 can check approval flags and checksum values to add another layer of security to workflow applications. The security enforcement responses of workflow manager 215 may include lock down of the workflow component if checksum values or approval flags do not match. Auditing and security functions of workflow manager 215 ensure congruence between the code of each workflow component as written by the programmers and the workflow metadata. Essentially, the security and auditing functions of workflow manager 215 guarantee that workflow programs execute according to the workflow requirements.

Metadata properties also may be used to generate documentation for the workflow components, similar to JAVA-DOC. The JAVADOC system, though, is used to provide documentation for programmers and generally has no relationship to documentation for operational activities. Essentially, JAVADOC or a similar program extracts information from metadata of each component and publishes the information without the end-users explicitly requesting the information directly from workflow manager 215. JAVADOC or similar programs generate documentation independently from the code of particular workflow components, which allows for interaction to occur between multiple workflow components. For example, an audit process reviewing the airline check-in workflow mentioned above can identify that passenger John Doe currently at the ticket counter has a membership in the airline's reward program. The audit process can then initiate a workflow component offering an option to upgrade to first class for free and issue an approval flag allowing for the free upgrade. In this example, the documented metadata allowed an interaction between two separate workflow components.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for creating a dynamic workflow documentation of a plurality of workflow components, the computer implemented process comprising:
   starting a workflow manager and a class loader program in a computer memory;
   creating an instance of a workflow program having an associated workflow component in the computer memory;
   notifying the workflow manager that a new instance of the workflow program having the associated work flow component has been created;
   using the class loader program, checking for an approval flag to verify that the workflow program has received an approval for a use by an enterprise;
   validating a checksum value to confirm that the workflow program has not been altered or tampered with since receiving the approval for the use by the enterprise;
   extracting a metadata property from the workflow program;
   recording the metadata property in the memory;
   repeating the steps of creating an instance of the workflow program, extracting the metadata property, recording the metadata property, and notifying the workflow manager that the workflow program having the associated work flow component has been created; and
   using the workflow manager, periodically polling the workflow program to retrieve an updated metadata property, analyzing the updated metadata property, producing a workflow status information, and publishing the workflow status information as a file;
   wherein the dynamic workflow documentation of the plurality of workflow components is facilitated.

* * * * *